Aug. 20, 1963 W. J. REICH, JR., ETAL 3,101,069
SHOCK SENSOR
Original Filed Aug. 3, 1960 2 Sheets-Sheet 1

INVENTORS.
WILLIAM J. REICH, JR.
CHARLES WARD.
BY
ATTORNEY.

Aug. 20, 1963  W. J. REICH, JR., ETAL  3,101,069
SHOCK SENSOR

Original Filed Aug. 3, 1960  2 Sheets-Sheet 2

INVENTORS.
WILLIAM J. REICH, JR.
CHARLES WARD
BY
Raymond A. Paquin
ATTORNEY.

United States Patent Office 3,101,069
Patented Aug. 20, 1963

3,101,069
SHOCK SENSOR
William J. Reich, Jr., St. Albans, and Charles Ward, Westbury, N.Y., assignors to American Bosch Arma Corporation, a corporation of New York
Continuation of abandoned application Ser. No. 47,167, Aug. 3, 1960. This application Apr. 25, 1962, Ser. No. 193,037
4 Claims. (Cl. 116—114)

The present invention relates to shock indicators and has particular reference to shock level indicators of the frangible reed type.

This application is a continuation of our application serial No. 47,167, filed August 3, 1960, now abandoned.

It is imperative that delicate equipment and apparatus be protected from damaging shocks during handling and transportation to insure satisfactory operation when installed. This handling at any stage of assembly or shipment may cause malfunction or damage of sensitive components. The malfunction is not externally visible in many cases and detection is not possible until an operational check is performed. In order to be able to detect possibly defective equipment, it is desirable to attach a device to the shock sensitive equipment, temporarily during transportation, which would provide an obvious indication of shock loads applied through mishandling. The visible evidence would indicate that immediate tests were required and the fact that such evidence is readily visible would tend to make those handling the equipment use more caution. Permanent installation of the device is not precluded, but the instrument must be designed to accept the device as a fixture.

There are presently available several different types of shock sensors purportedly useful for this purpose but all of which suffer from a like deficiency that their rated response level is predicated upon a shock pulse of relatively extended duration. Each of the devices will withstand a short pulse shock of much greater magnitude, while some may even respond to smaller magnitude shocks to give a false indication of safety, or trouble.

The shock sensor of the present invention includes a plurality of loaded cantilever beams of frangible material each of which is tuned to a different resonant frequency. It has been found that while the single frangible reed is not satisfactory for a reliable indication, the combination of a number of these reeds in the manner of this invention produces a simple, inexpensive and reliable shock sensor.

Figure 1:
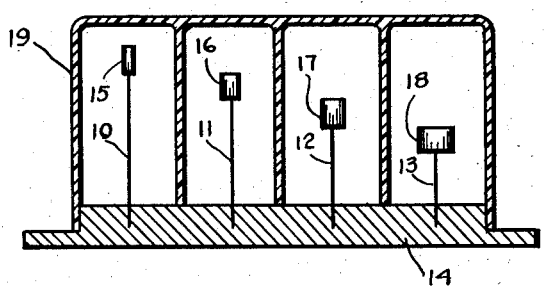
Figure 2:
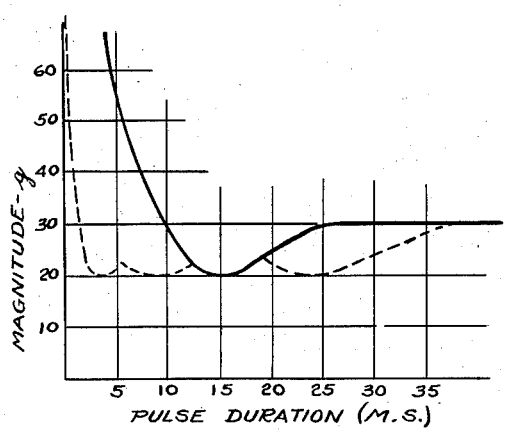
Figure 3:
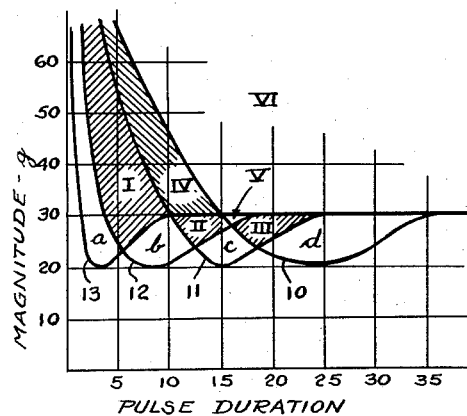
Figure 4:
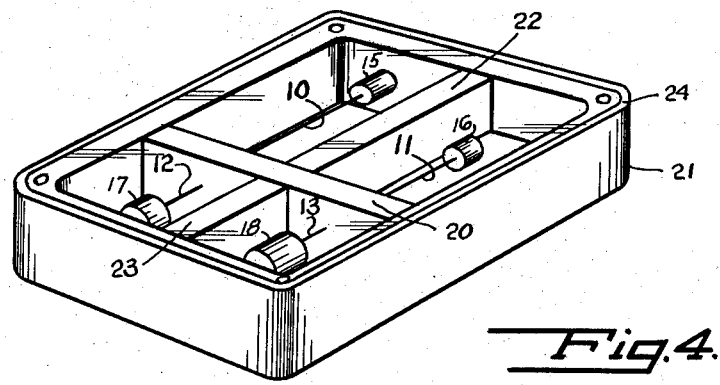
Figure 5:
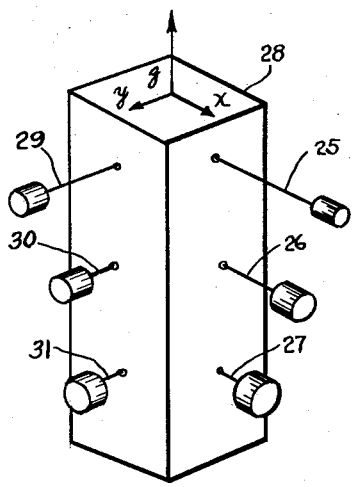
Figure 6:
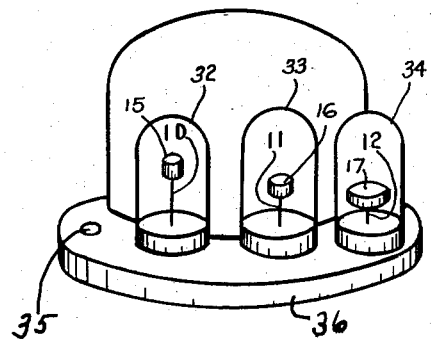

For a more complete understanding of the invention, reference may be had to the accompanying diagrams in which FIGURE 1 is a longitudinal cross sectional view through a central plane of symmetry of one embodiment of the invention, FIGURE 2 is a curve illustrating the operation of a portion of FIGURE 1, FIGURE 3 is a curve for interpreting the indication given by the apparatus of FIGURE 1, FIGURE 4 is another embodiment of the invention, FIGURE 5 is yet another embodiment of the invention, and FIGURE 6 is a modification of the invention.

With respect to FIGURE 1 of the drawings, the shock level sensor of this invention includes several end loaded cantilever beams 10, 11, 12, 13 of different natural frequencies attached to a common base 14. The beam material is frangible and brittle and is usually made of carbon rod or glass for example. The carbon rod in one particular example was .036″ diam., the size of an ordinary mechanical pencil lead. Each beam 10, 11, 12, 13 carries a weight 15, 16, 17, 18 respectively at the free end. A plastic cover 19 provides individual chambers for each of the reeds which prevent the weight from any broken beam from breaking other beams. The cover 19 is preferably transparent so as to permit inspection of the shock sensor without disassembly. The pattern of breakage will delimit both the magnitude and duration of the shocks undergone by the sensor as will be described.

The solid curve of FIGURE 2 generally illustrates the response of one of the beam-weight combinations, for example, the beam 11 and weight 16. Pulse duration is plotted on the abscissa, the shock magnitude is plotted as the ordinate. This curve results from application of a pulse having the shape of a half sine wave. The half sine wave shock was chosen for experimental use and evaluation tests for several reasons. It is substantially the shape most likely to be encountered when articles are dropped. It is simple to simulate and to control in magnitude. Single peak shocks have substantially the same effect as half sine waves.

Breakage of the beam will occur for any particular combination of shock level and pulse duration lying above the curve while any other combination will leave the beam intact. Thus, it is seen that the beam with the characteristics of FIGURE 2 will break under 30 $g$ shocks which persist for 25 milliseconds or more, will withstand shocks of greater than 30 $g$ which are less than 10 milliseconds in duration and will break under shocks of less than 30 $g$ for pulse durations between 10 and 25 milliseconds. The values here quoted are illustrative and in no way limiting. It will break under a minimum shock of 20 $g$ which persists for 15 milliseconds. A frangible beam having the characteristics of FIG. 2 would be known as a 20 $g$ sensor. However, this characterization is a misnomer since for only one particular set of circumstances the beam will break under a 20 $g$ shock while under other conditions can withstand 100 $g$ or more. It has been found that shocks incurred by dropping steel casings on concrete floors have pulse durations of between one and 10 milliseconds and therefore would not be detected by a single frangible reed even though the magnitude is high.

The pulse duration at which the minimum magnitude shock level causes breakage is determined by the natural frequency of the beam. For a given beam, the "$g$" level at which breakage actually occurs depends upon the stress in the beam, i.e., the deflection caused by the shock force. The range of pulse duration which causes breakage within a small percentage of the minimum $g$ level for a single reed is small, but the range for a composite shock sensor is extended by the addition of more beams such as beams 10, 12, and 13 which are each tuned to a different natural frequency but all of which are designed to break at the same minimum $g$ level.

In order for the four sensors to have the same minimum breaking level, the product of the length of the beam and the value of the weight at the end of the beam must be the same for all sensors if the beam material and size is identical for each beam. Other designs will accomplish the same result, e.g., change the size, and material of the beams instead of the length and weight, if desired.

Thus, FIGURE 3 illustrates the response of each of the beams 10, 11, 12, and 13, in curves labeled 10, 11, 12, 13 respectively. Each curve approaches the same value, 30 $g$, asymptotically, and each has a minimum breaking shock of 20 $g$ but the pulse duration for the minimum is centered at 22.5, 15, 7.5 and 2.5 milliseconds, respectively, thereby providing means for detecting shocks of 20 $g$ for pulse durations of between 2.5 and 27.5 milliseconds with uncertainties of no more than three g's where the various curves intersect. The composite response (representing at least one broken reed) is shown by the dotted curve in FIGURE 2 for comparison with the single reed response. Other information of interest can be obtained by examining the pattern of breakage of the four reeds. For example, if only reed 13 is broken it will be seen that the pulse duration causing breakage was less than 5 milliseconds and the magnitude was greater than 20 g. If only reed 12 is broken the shock pulse had a duration between 5 and 12½ milliseconds and magnitude between 20 g and 30 g. If only reed 11 is broken the shock pulse had a duration between 12½ and 19 milliseconds and a magnitude between 20 g and 27 g, and if only reed 10 is broken the shock pulse had a duration between 19 and 37.5 milliseconds and a magnitude between 20 g and 30 g.

In a similar fashion, from the data in FIGURE 3, the following table can be prepared to delimit the pulse duration and magnitude by the particular breakage pattern which occurs.

| Broken beams | Range pulse duration (ms.) | Range pulse magnitude (g) |
| --- | --- | --- |
| 13 | Less than 6 | Above 20. |
| 12 | 6–12.5 | 20–29. |
| 11 | 12.5–19 | 20–28. |
| 10 | 19–37.5 | 20–30. |
| 13, 12 | Less than 10 | Above 22 (area I). |
| 12, 11 | 10–16 | 23–30 (area II). |
| 11, 10 | 16–25 | 23–30 (area III). |
| 13, 12, 11 | Less than 15 | Above 30 (area IV). |
| 12, 11, 10 | 15–18 | 27–30 (area V). |
| All | Indefinite | Above 30 (area VI). |

FIGURES 4 and 5 show alternate embodiments of the invention. In FIGURE 4 beams 10, 11, 12 and 13 and weights 15, 16, 17 and 18 may all be identical with corresponding elements of FIGURE 1, but in the present example the beams 10, 11, 12, 13 are all attached to the cross piece 20 held between the walls of case 21. Four separate chambers are made by adding the interior walls 22, 23 in each of which there is one beam and weight assembly. A transparent cover 24 protects the beams from physical damage.

It will be seen that the sensors of FIGURES 1 and 4 are insensitive to shocks longitudinally of the beams 10–13. FIGURE 5 shows schematically how a three dimensional or universal sensor can be assembled but makes no pretense at showing a preferred construction. Considering three mutually perpendicular axes $x$, $y$, $z$, one series of beams 25, 26, 27 are attached to a base 28 and a second series of beams 29, 30, 31 are also attached to the base 28 but the two series of beams extend in the $x$ and $y$ directions respectively, i.e., perpendicular to each other. Thus, shock loads in the $x$ direction, i.e., longitudinally of beams 25, 26, 27 can cause breakage of beams 29, 30, 31. Shocks in the $y$ direction cause breakage of beams 25, 26, 27 and shocks in the $z$ direction affect both sets of beams.

FIGURE 6 shows a further modification in which the beams 10, 11, 12 and the weights 15, 16 and 17 may be identical with the corresponding beams and weights of the embodiment of FIGURE 1, but are put in individual containers 32, 33, 34 for temporary attachment in mounting holes 35 existing on the base 36, it being understood that the base 36 is also attached to the equipment being shipped. For this invention a plurality of such containers must be attached to the apparatus 36 since it has been shown before that one beam is not sufficient for reliable information.

Having described the features of our invention many other embodiments will become evident to those skilled in the art. Therefore, the invention should not be limited in form to any of those embodiments here described but rather it should be defined by the scope of the appended claims.

We claim:

1. In a device of the character described for indicating that excessive shock along a given axis has been experienced, a base, a plurality of frangible reeds extending perpendicularly to said axis, made of similar material and section but unequal in length, and each secured at one end to said base, a plurality of unequal masses attached to the free ends of said reeds, said reeds being disposed so as to be frangible by said masses in response to acceleration of said base along said axis, said masses being attached to said reeds in graduated sequence such that the products of the reed length and the mass weight are equal for each combination of reed and mass, whereby the resonant frequencies of the resultant reed and mass combinations are made different while the minimum accelerations along said axis for which said reeds break are made substantially the same.

2. A shock sensor, comprising:
   a base member;
   a plurality of weight-loaded frangible cantilever beam elements attached to said base member and extending from said base member in positions such that all of said beam elements are frangible in response to acceleration of said base in a given direction;
   each of said weight-loaded cantilever beam elements having a breaking level, in response to said acceleration, which varies with the duration of said acceleration and which has a minimum value at a duration determined by the resonant frequency of mechanical vibration of said each beam element with respect to said base member;
   said beam elements having substantially the same minimum value of said breaking level, but having different resonant frequencies of mechanical vibration with respect to said base member so that said minimum value occurs at different durations of said acceleration for different ones of said beam elements;
   whereby accelerations of said base member in said direction in excess of said minimum level are detected over a widened range of durations of said acceleration.

3. A sensor in accordance with claim 2, in which said beam elements extend parallel to each other.

4. A sensor in accordance with claim 2, in which said cantilever beam elements comprise a plurality of beams of different lengths and a plurality of different masses attached to the free ends of said beams in graduated sequence such that the smallest of said masses is connected to the longest of said beams.

References Cited in the file of this patent

UNITED STATES PATENTS 2,667,142    Kane _____ Jan. 26, 1954